(12) United States Patent
Hanashima et al.

(10) Patent No.: US 7,286,741 B2
(45) Date of Patent: Oct. 23, 2007

(54) SILICA OPTICAL WAVEGUIDE AND METHOD OF MANUFACTURING THE SAME

(75) Inventors: Naoki Hanashima, Tokyo (JP); Reio Mochida, Tokyo (JP)

(73) Assignee: TDK Corporation, Tokyo (JP)

( * ) Notice: Subject to any disclaimer, the term of this patent is extended or adjusted under 35 U.S.C. 154(b) by 219 days.

(21) Appl. No.: 11/061,870

(22) Filed: Feb. 22, 2005

(65) Prior Publication Data

US 2005/0196116 A1    Sep. 8, 2005

(30) Foreign Application Priority Data

Mar. 2, 2004  (JP) .............................. 2004-056995

(51) Int. Cl.
*G02B 6/10* (2006.01)
*G02B 6/00* (2006.01)

(52) U.S. Cl. ...................... 385/132; 385/129; 385/130; 385/141; 385/144

(58) Field of Classification Search ........ 385/129–132, 385/141, 144; 65/386
See application file for complete search history.

(56) References Cited

U.S. PATENT DOCUMENTS

| 5,408,569 | A | * | 4/1995 | Nishimoto | .................. 385/132 |
| 6,044,192 | A | | 3/2000 | Grant et al. | |
| 6,553,170 | B2 | * | 4/2003 | Zhong et al. | ............... 385/130 |

* cited by examiner

*Primary Examiner*—Frank G. Font
*Assistant Examiner*—Michael P. Mooney
(74) *Attorney, Agent, or Firm*—Oliff & Berridge, PLC

(57) ABSTRACT

The invention relates to a silica optical waveguide having a clad layer and a core formed from a silica material and a method of fabricating the same and provides a silica optical waveguide in which the position of a core can be easily recognized and a method of manufacturing the same. The waveguide has a lower clad layer formed from silicate glass on a silica substrate, a core formed from silicate glass on the lower clad layer, and an upper clad layer formed of silicate glass on the lower clad layer so as to embed the core. A difference of height is provided on a top surface of the upper clad layer such that a difference between reflections from the position of the core and from other positions can be recognized on the top surface of the upper clad layer.

3 Claims, 4 Drawing Sheets

SILICA OPTICAL WAVEGUIDE AND METHOD OF MANUFACTURING THE SAME

BACKGROUND OF THE INVENTION

1. Field of the Invention

The present invention relates to a silica optical waveguide having a clad layer and a core formed of a silica material and a method of fabricating the same.

2. Description of the Related Art

In general, an optical waveguide has a substrate, a clad layer formed on the substrate and a core (optical waveguide) which is embedded in the clad layer and which has a refractive index slightly higher than that of the clad layer. The clad layer is constituted by a lower clad layer disposed under the core (on the substrate side of the core) and an upper clad layer disposed above the lower clad layer so as to embed the core. Light input to the optical waveguide is confined in the core because of the difference between the refractive indices of the core and the clad layer and is propagated in the core.

In a silica optical waveguide, silicon or silica is used as a material of the substrate thereof, and the core and clad layer are made of silicate glass using a flame hydrolysis deposition (FHD) process, sputtering process, or chemical vapor deposition (CVD) process. Since the refractive index of a silicon substrate is greatly different from the refractive index of the clad layer and the core formed of silicate glass, the position of the core formed on the silicon substrate can be relatively easily recognized when observed in a direction normal to the surface of the substrate. However, when the substrate is formed of a silica material, since the refractive index of the substrate and the refractive index of the clad layer and the core are substantially equal to each other, a problem arises in that the position of the core is difficult to recognize when observed in a direction normal to the surface of the substrate. This results in another problem in that an aligning and connecting operation of input/out fiber becomes difficult to perform properly.

When the material to form the upper clad layer is deposited such that it follows the shape of the core, a step is formed on the surface of the upper clad layer because of the presence of the core. It is therefore possible to recognize the position of the core easily by taking advantage of a difference in reflection between the flat portion and the step portion.

However, when there is a narrow gap region in a waveguide layout of cores on which an upper clad layer is deposited using a CVD process so as to embed the core, the material of the upper clad layer may not be deposited at the gap to leave a void (whisker) in such a region. Methods proposed to avoid this include a method in which an upper clad layer is formed while sputter-etching the same and a method in which an upper clad layer is formed using a material having a low softening temperature and is made to flow by softening it at a high temperature to fill a void (see Patent Document 1).

Patent Document 1: Specification of U.S. Pat. No. 6,044,192

However, when the generation of a void is suppressed by softening an upper clad layer to make it flow, the surface of the upper clad layer is softened and flattened, and a step on the surface becomes gentler, which results in a problem in that it will be difficult to recognize the position of a core.

It is an object of the invention to provide a silica optical waveguide in which the position of a core thereof can be easily recognized and a method of manufacturing the same.

SUMMARY OF THE INVENTION

The above-described object is achieved by a silica optical waveguide characterized in that it has a silica substrate, a lower clad layer formed on the silica substrate, a core formed on the lower clad layer, and an upper clad layer formed on the lower clad layer so as to embed the core and in that a top surface of the upper clad layer has a difference of height in a direction normal to the surface of the substrate between a position associated with the core and other positions.

The invention provides a silica optical waveguide as described above, characterized in that the difference of height is provided such that a difference between reflections from the top surface of the clad layer can be recognized and in that the difference of height is not smaller than 0.2 μm and not greater than the height of the core.

The invention provides a silica optical waveguide as described above, characterized in that the upper clad layer is made of silicate glass doped with boron and phosphorous.

The above-described object is achieved by a method of manufacturing a silica optical waveguide characterized in that it has the steps of forming a lower clad layer on a silica substrate, forming a core on the lower clad layer, and forming a film of silicate glass on the lower clad layer so as to embed the core and softening the film to cause it to flow, thereby forming an upper clad layer having a difference of height on its top surface in a direction normal to the surface of the substrate between a position associated with the core and other positions.

The invention provides a method of manufacturing a silica optical waveguide as described above, characterized in that the difference of height is provided such that a difference between reflections from the top surface of the clad layer can be recognized and in that the difference of height is not smaller than 0.2 μm and not greater than the height of the core.

The invention provides a method of manufacturing a silica optical waveguide as described above, characterized in that the silicate glass constituting the upper clad layer is added with boron and phosphorous.

According to the invention, the position of the core can be easily recognized when observed in the direction normal to the substrate surface.

DESCRIPTION OF THE PREFERRED EMBODIMENT

A silica optical waveguide and a method of manufacturing the same according to an embodiment of the invention will now be described with reference to FIGS. 1 to 4.

Figure 1:
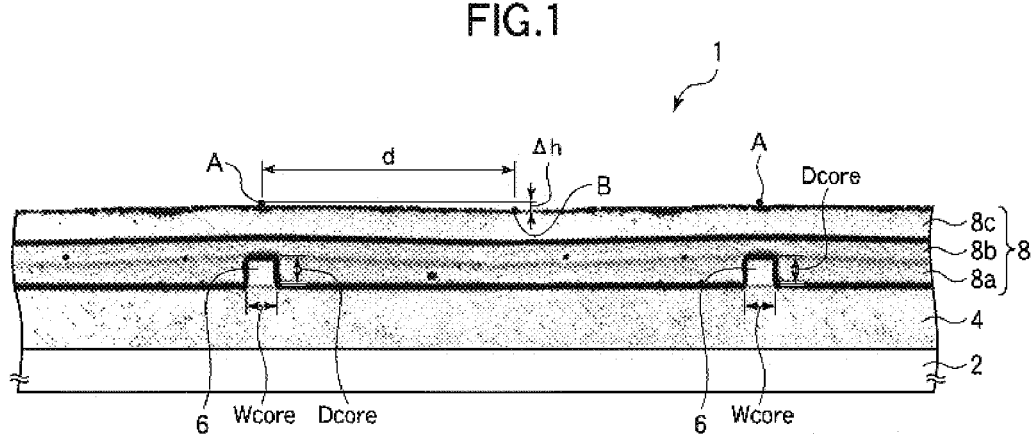
FIG. 1 shows a section of a silica optical waveguide according to an embodiment of the invention taken in a direction orthogonal to the direction in which cores elongate.

FIG. 1 shows a section of a silica optical waveguide 1 manufactured using a method of manufacturing a silica optical waveguide according to the present embodiment, the section being taken in a direction orthogonal to the direction in which a core extends. Referring to FIG. 1, a lower clad layer 4 is formed of silicate glass on a silica substrate 2. A plurality of cores 6 made of silicate glass doped with germanium having a rectangular sectional shape are formed side by side on the lower clad layer 4. The sections of the cores 6 have a width Wcore=7 μm in the direction of the surface of the substrate and a height Dcore=7 μm in a direction normal to the substrate surface.

An upper clad layer 8 is formed on the lower clad layer 4 so as to embed the cores 6. The upper clad layer 8 in the present embodiment has a three-layer structure consisting of a first layer 8a that is a 6 μm thick silicate film (BPSG) doped with boron (B) and phosphorous (P), a second layer 8b that is 6 μm thick BPSG, and a third layer 8c made of silica having a thickness of 15 μm, the layers being formed in the order listed starting with the first layer as a bottom layer.

Gentle slopes are formed on a top surface of the upper clad layer 8, and a position B substantially in the middle of adjoining cores 6 is formed lower than positions A above the cores 6 (the position B being at a distance d from the positions A) by a relative height difference Δh.

The height difference Δh is provided to have such a magnitude that a difference in reflections at adjoining positions A-A (or adjoining positions B-B) on the top surface of the upper clad layer 8 in a direction normal to the substrate surface can be recognized. When a laser microscope is used as will be described later, the height difference Δh is required to be only about 0.2 μm or more because the difference is only required to be greater than one-half of the wavelength of the laser light. In the present embodiment, the height difference Δh is about 2 μm, and the positions of a core 6 can be easily recognized by observing it in the direction normal to the substrate surface using a general optical microscope.

The height difference Δh on the top surface of the upper clad layer 8 is provided by controlling softening of the first layer 8a to the third layer 8c constituting the upper clad layer 8 to soften them to flow after they are sequentially formed using a CVD process such that the surface of the upper clad layer 8 will not be completely flattened. By controlling the softening process to flow, the height of the surface of the upper clad layer 8 can be differentiated between positions near the cores 6 and positions away from the cores 6 to facilitate recognition of the positions of the cores 6, and the silica optical waveguide 1 can be fabricated without any void at gaps between adjoining cores 6. In order to avoid the formation of voids from the flow for a gap-filling, the upper clad layer 8 may be formed such that the height difference Δh is substantially equal to or smaller than the height Dcore of the cores 6.

A specific embodiment of a method of manufacturing a silica optical waveguide 1 according to the present embodiment will now be described with reference to FIGS. 1 to 3B. A lower clad layer 4 is formed from silicate glass on a silica substrate 2 using a plasma CVD process, and a core forming layer is subsequently formed from silicate glass doped with germanium. Next, the core forming layer is patterned using a photolithographic process to form a plurality of cores 6 having a rectangular section with a width Wcore of 7 μm and a height Dcore of 7 μm. Next, a silicate film (BPSG) whose softening temperature has been decreased by doping boron (B) and phosphorous (P) is formed throughout the substrate to a thickness of 6 μm using a plasma CVD process, whereby a first layer 8a of an upper clad layer 8 is formed. Next, the layer is softened to flow of the same at 1000° C. for 24 hours.

Similarly, a 6 μm thickness BPSG film is formed to provide a second layer 8b which is then softened to flow of the same at 1000° C. for 24 hours. Finally, a 15 μm thickness silica film is formed using a plasma CVD process to form a third layer 8c which is then subjected to an annealing. A silica optical waveguide 1 according to the present embodiment is completed through the above-described steps.

A plurality of silica optical waveguides were fabricated, which had cores 6 with a fixed height (Dcore) of 7 μm and which had different height differences (Δh) 0 μm to 9 μm on the surfaces of respective upper clad layers 8 provided by varying the annealing condition of the first layers 8a, the second layers 8b, and the third layers 8c of the upper clad layers 8 during fabrication of the same as described above. Table 1 shows a comparison of visibility of core positions and generation of a void between the plurality of silica optical waveguides having different height differences Δh, i.e., 0 μm to 9 μm on the surfaces of the respective upper clad layers 8. In table 1, it is stated "good" to indicate high visibility of core positions in the column of "core position visibility", and it is stated "poor" to indicate low visibility of core positions. It is stated "none" in the column of "void" to indicate that there was no void, and it is stated "yes" to indicate that there was a void. Table 1 indicates that no void is generated and that the positions of the cores can be easily recognized when the height difference Δh is in the range from 3 μm to 6 μm.

TABLE 1

| Core 6 Height (Dcore) | Height Difference (Δh) on Upper Clad Layer 8 | Core Position Visibility | Void |
|---|---|---|---|
| 7 μm | 9 μm | Good | Yes |
| 7 μm | 6 μm | Good | None |
| 7 μm | 3 μm | Good | None |
| 7 μm | 0 μm | Poor | None |

A description will now be made on how characteristics of the upper clad layer 8 change when it is softened to flow of the same while varying the softening temperature of the material of the layer. The softening temperature of glass decreases as the total amount of dopants to the same increases. The amount of boron added to the silica material forming the upper clad layer 8 was kept constant at 3 mol %, and phosphorous was added in two different amounts, i.e., (a): 1 mol % and (b): 2 mol %. A comparison was made between resultant upper clad layers 8 to see how they were different in shape and in visibility in a direction normal to the surfaces of the substrates after they were softened to flow.

Figure 2A:
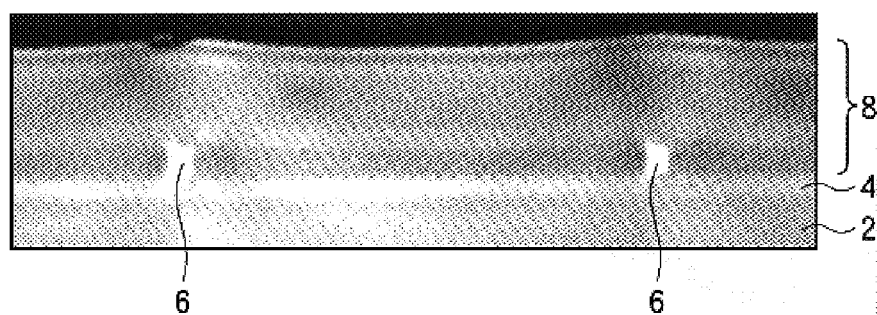
FIGS. 2A and 2B show sections of two silica optical waveguides fabricated by incorporating different dopant to the silica materials of respective upper clad layers 8 taken in a direction orthogonal to the direction in which cores elongate.
Figure 2B:
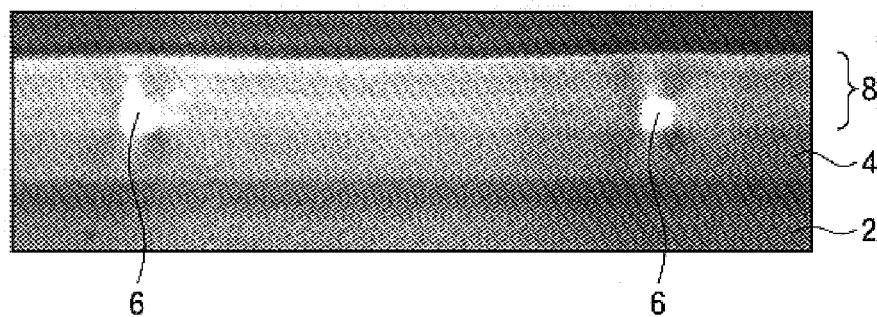

FIG. 2A shows a section of the waveguide added with 1 mol % of phosphorous, and FIG. 2B shows a section of the waveguide added with 2 mol % of phosphorous. The distance between cores 6 (2·d) was 127 μm in both waveguides. The waveguide in FIG. 2A had a height difference Δh1 of 2.4 μm, and the waveguide in FIG. 2B has a height difference Δh2 of 0.8 μm.

Figure 3A:
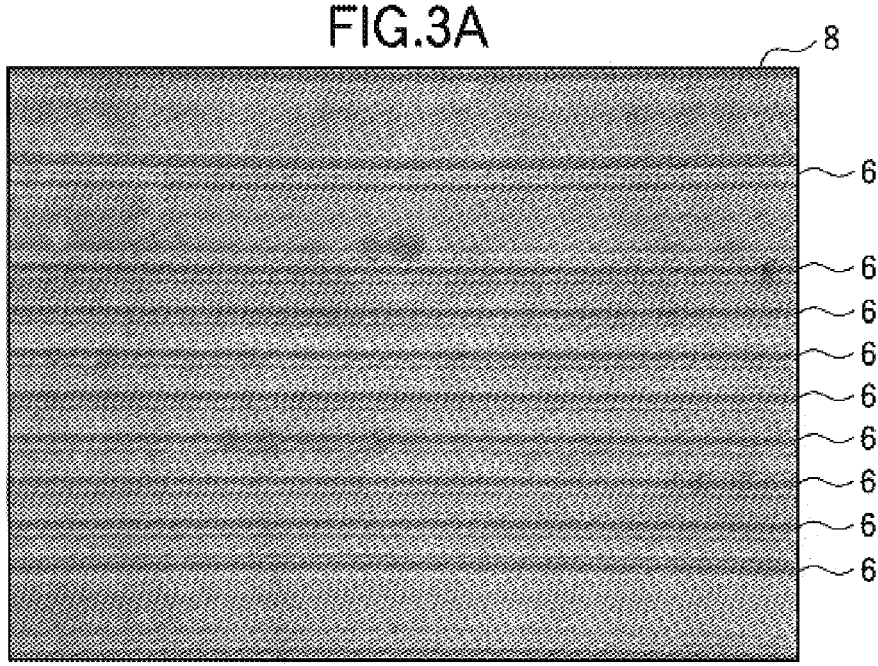
FIGS. 3A and 3B show two silica optical waveguides having different height differences Δh as viewed in a direction normal to the surfaces of substrates thereof.
Figure 3B:
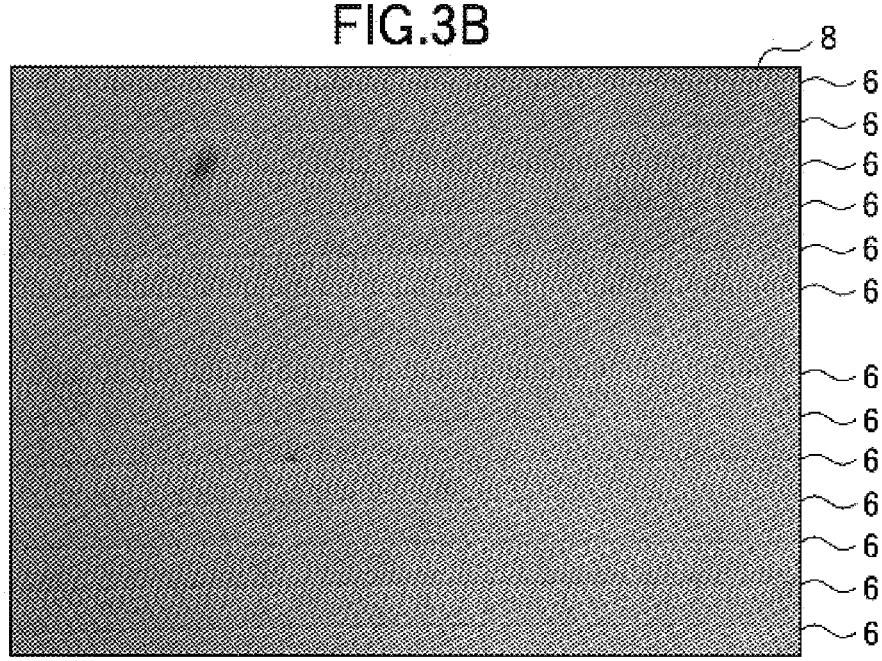

FIGS. 3A and 3B show the two silica optical waveguides having different height differences Δh as observed in a direction normal to the surfaces of the substrates. FIG. 3A shows an image observed from above the top surface of the silica optical waveguide shown in FIG. 2A, and FIG. 3B shows an image observed from above the top surface of the silica optical waveguide shown in FIG. 2B. Both images are the observed images obtained by a common optical microscope. As apparent from FIGS. 3A and 3B, visibility of the cores 6 is much higher in the case of the height difference Δh1 of 2.4 μm than in the case of the height difference Δh2 of 0.8 μm. As thus described, it is apparent that the visibility of the cores 6 as viewed from above varies significantly depending on the height difference Δh of the top surface of the upper clad layer 8 around the core.

An image of a waveguide observed from above is constituted by a distribution of reflected light that is attributable to a difference between the refractive indices of the cores and clad of the waveguide and a distribution of reflected light from the surface of the upper clad layer 8. Referring to the former factor, since the difference between the refractive indices is as small as about $10^{-3}$, there is not so high contrast (a difference in brightness) in the core regions. Referring to the latter factor, reflected light is determined by a difference between refractive indices at the interface between the upper clad layer 8 and the air. For example, when the upper clad layer 8 is formed of silicate glass, there is a refractive index difference of about 0.5 which results in contrast considerably higher than that attributable to the former factor. Therefore, when a height difference Δh is provided between the regions of the cores 6 and other regions on the surface of the upper clad layer 8, the distribution of reflected light becomes nonuniform, and the visibility of the cores 6 of the waveguide is thereby improved.

As thus described, the positions of the cores 6 are recognized from a difference in brightness (contrast) between the regions of the cores 6 and other regions, in the observed image. Contrast is generated by a difference between quantities of light from the respective regions, and it should be therefore noted that reflected light can be made nonuniform by any unnecessary irregularities of height on the surface of the upper clad layer 8 to result in a difference in brightness which constitutes a noise component.

The recognition of the positions of the cores 6 is required when an optical fiber is aligned and connected to the optical waveguide substrate. It is therefore desirable that the positions of the cores 6 in the silica optical waveguide 1 as viewed from above can be easily checked using a simple optical system. In this regard, the silica optical waveguide 1 of the present embodiment is advantageous when it is thus aligned and connected because the positions of the cores 6 can be easily checked using a common optical microscope. In the case of the use of a common optical microscope, contrast attributable to reflected light from the surface of the upper clad layer 8 becomes too low when the height difference Δh is only about 0.8 μm as shown in FIG. 2B, and image recognition will be made by reflected light from the cores 6 themselves. It is therefore preferable that the height difference Δh is 1 μm or more when an optical microscope is used.

The invention is not limited to the above-described embodiment and may be modified in various ways.

Figure 4:
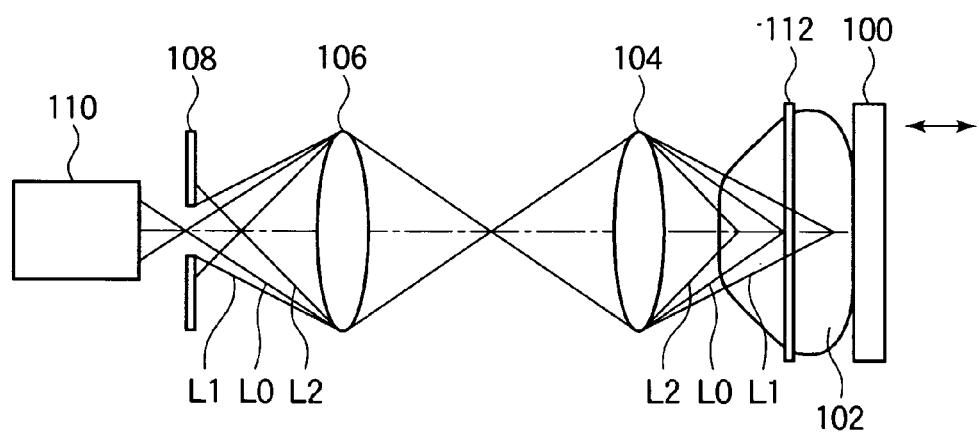
FIG. 4 shows a schematic configuration of a confocal microscope.

While the above embodiment has been described with reference to recognition of core positions using an optical microscope byway of example, this is not limiting the invention. For example, a confocal microscope or automatic focusing microscope (which are also referred to as laser microscopes) may be used instead of a common optical microscope. FIG. 4 shows a schematic configuration of a confocal microscope. A focal plane 112 of an objective lens 104 and a focal plane of a confocal lens 106 are in a conjugate relationship with each other, and a pin hole 108 is provided on the focal plane of the confocal lens 106.

As a result, when a stage 100 is moved in the direction of an optical axis to move the observing position of a sample 102 on the stage 100 into the focal plane 112, only an image of the observed position passes through the pin hole 108 to fall upon a detection unit 110. When a combination of a single-wavelength light source such as a laser and a confocal optical system or automatic focusing mechanism is used, a considerably small focal depth can be achieved, and contrast attributable to a surface height difference can be enhanced. It is therefore possible to detect the positions of cores from a height difference Δh smaller than that in the case in which an optical microscope is used. While core positions can be detected from a height difference Δh of 0.1 μm in general, it is desirable to form slopes on the surface of the upper clad layer 8 such that the height difference Δh becomes 0.3 μm or more in order to prevent any recognition error attributable to minute swells on the surface.

What is claimed is:

1. A silica optical waveguide comprising:
   a silica substrate;
   a lower clad layer formed on the silica substrate;
   a first core and an adjoining core that adjoins the first core formed on the lower clad layer; and
   an upper clad layer formed on the lower clad layer so as to embed the first core and the adjoining core and so as to form a gentle slope on a top surface of the upper clad layer between a position substantially above the first core to a position substantially in a middle of the first core and the adjoining core, wherein the top surface of the upper clad layer has a difference of height in a direction normal to the surface of the substrate between a position substantially above the first core to a position substantially in the middle of the first core and the adjoining core that is not less than about 0.2 μm and that is less than the height of the core.

2. A silica optical waveguide according to claim 1, wherein the difference of height is provided such that a difference between reflections from the top surface of the upper clad layer can be recognized.

3. A silica optical waveguide according to claim 1, wherein the upper clad layer is made of silicate glass doped with boron and phosphorous.

* * * * *